United States Patent
Zou et al.

(10) Patent No.: US 12,135,926 B2
(45) Date of Patent: Nov. 5, 2024

(54) METHOD FOR QUICKLY OPTIMIZING KEY MINING PARAMETERS OF OUTBURST COAL SEAM

(71) Applicants: Chongqing University, Chongqing (CN); North China Institute Of Science And Technology, Beijing (CN)

(72) Inventors: Quanle Zou, Zhenping County (CN); Zhiheng Cheng, Beijing (CN); Liang Chen, Beijing (CN); Hongbing Wang, Zhecheng County (CN); Tengfei Ma, Qingfeng County (CN); Zihan Chen, Chaozhou (CN); Zhenli Zhang, Xinmi (CN); Zhimin Wang, Chongqing (CN); Ying Liu, Chongqing (CN)

(73) Assignees: Chongqing University, Chongqing (CN); North China Institute Of Science And Technology, Beijing (CN)

( * ) Notice: Subject to any disclaimer, the term of this patent is extended or adjusted under 35 U.S.C. 154(b) by 738 days.

(21) Appl. No.: 17/349,167

(22) Filed: Jun. 16, 2021

(65) Prior Publication Data
US 2021/0390230 A1 Dec. 16, 2021

(30) Foreign Application Priority Data
Jun. 16, 2020 (CN) .......................... 202010546093.3

(51) Int. Cl.
*G06F 30/27* (2020.01)
*E21C 39/00* (2006.01)
(Continued)

(52) U.S. Cl.
CPC .............. *G06F 30/23* (2020.01); *E21C 39/00* (2013.01); *G06F 30/27* (2020.01); *G06N 3/04* (2013.01);
(Continued)

(58) Field of Classification Search
CPC ...... G06F 30/23; G06F 30/27; G06F 2111/10; E21C 39/00; G06N 3/04; G06N 3/088
See application file for complete search history.

(56) References Cited

FOREIGN PATENT DOCUMENTS

| CN | 106126821 B | * | 4/2019 | ......... G06F 17/5004 |
| CN | 112560226 B | * | 12/2023 | ............. G06F 30/20 |

OTHER PUBLICATIONS

Islam et al. Numerical Simulation of Stress Distributions and Displacements Around an Entry Roadway With Igneous Intrusion and Potential Sources of Seam Gas Emission of The Barapukuria Coal Mine, NW Bangladesh International Journal of Coal Geology 78 (2009) (Year: 2009).*

* cited by examiner

*Primary Examiner* — Rehana Perveen
*Assistant Examiner* — Cuong V Luu
(74) *Attorney, Agent, or Firm* — WPAT, PC

(57) ABSTRACT

A method for quickly optimizing key mining parameters of an outburst coal seam as provided includes steps of constructing a graphic basic information model of the coal mine, giving coal mine characteristic information, performing mining simulation, constructing a CNN-LSTM predicating model, obtaining changes under different mining conditions, constructing a Lorenz chaotic primer, and the like. The model can be improved with continuous breakthroughs in theory, so that the model has a strong learning ability and can adapt to the constantly changing complex geological environment. The method has very good predictability for the determination of coal seam group parameters, and can efficiently select and output a set of candidate parameters.

4 Claims, 3 Drawing Sheets

(51) Int. Cl.
  *G06F 30/23* (2020.01)
  *G06N 3/04* (2023.01)
  *G06N 3/088* (2023.01)
  *G06F 111/10* (2020.01)
(52) U.S. Cl.
  CPC .......... *G06N 3/088* (2013.01); *G06F 2111/10* (2020.01)

METHOD FOR QUICKLY OPTIMIZING KEY MINING PARAMETERS OF OUTBURST COAL SEAM

TECHNICAL FIELD OF THE INVENTION

The invention relates to the field of mining technology engineering, in particular to a method for quickly optimizing key mining parameters of an outburst coal seam.

BACKGROUND OF THE INVENTION

In the prior art, selection of mining parameters of coal mines mainly relies on experience and cannot comprehensively consider multiple factors. Inappropriate selection of mining parameters will cause misalignment of mining, resulting in safety hazards, and waste of manpower and financial resources.

Numerical simulation of coal mines can simulate and analyze the stress changes, displacement changes, fissure changes and gas field changes during the mining process according to relevant computer software. Accurate reference data for production practice is provided. However, the operation of the existing numerical simulation method is complicated and cannot be changed interactively. The difficulty for users to use software for numerical simulation is virtually increased.

Therefore, it is urgent to develop a more accurate prediction model and method optimizing model.

SUMMARY OF THE INVENTION

The objective of the invention is to provide a method for quickly optimizing key mining parameters of an outburst coal seam to solve the problems existing in the prior art.

The technical solution adopted to achieve the objective of the present invention is as follows: a method for quickly optimizing key mining parameters of an outburst coal seam includes the following steps:

1) constructing an automatic numerical simulating model by constructing a repetitive command system; and obtaining a graphic basic information model of the coal mine according to the simulation analysis of the basic information of the coal mine by three-dimensional finite difference program, where the basic information of the coal mine includes an inclination angle and a thickness of a coal rock layer; and each coal rock layer is divided into a certain number of units;
2) giving coal mine characteristic information to units in different positions in the graphic basic information model, where the coal mine characteristic information includes initial physical and mechanical parameters; and physical and mechanical property parameters include rock bulk density, compression resistance, shear resistance, tensile strength and tangential stiffness;
3) inputting coal mine simulating mining information to perform programmed mining simulation; and outputting and storing the stress field changes, displacement field changes, gas pressure field changes and fissure field changes during the mining process in a database; where the mining information includes a mining sequence, mining height and a mining rate;
4) changing the coal seam mining sequence, mining height and mining speed respectively, repeating the step 3), and obtaining a data set of the displacement fields, stress fields, gas fields and fracture fields under different mining sequences, different mining height and different mining speed;
5) changing the initial physical and mechanical parameters of the coal rock layer and repeating steps 2) to 4) to obtain a secondary database of sample data for numerical simulation of the coal layer under different initial physical and mechanical parameters;
6) changing the inclination angle and the thickness of the coal rock layer and repeating steps 1) to 5) to obtain a secondary database of sample data for coal rock simulation of the coal rock layer under different inclination angles and thicknesses;
7) normalizing the above data, where grey relational analysis is carried out to analyze the variable characteristics of a coal seam mining sequence, a mining height, a mining speed, a coal rock layer inclination angle, a coal rock layer thickness and physical and mechanical parameters;
8) constructing and training a CNN-LSTM predicting mode, where the CNN-LSTM predicting model includes two convolutional neural layers and a long- and short-term neural layer; and each convolutional neural layer includes an input layer, a convolutional layer, a pooling layer, a weighted connecting layer, and an output layer;
9) inputting the required simulated coal mine information, changing the coal seam mining sequence, mining height and mining speed, and obtaining the stress field changes, the displacement field changes, the gas field changes and the fissure field changes under different mining conditions, where the coal mine information includes variable characteristics of the inclination angle of the coal rock layer, the thickness of the coal rock layer and the physical and mechanical parameters;
10) taking the changes of the coal seam stress fields, displacement fields, gas fields and fissure fields as four variables to construct a system of ordinary differential equations, where a Lorenz differential equations is used to construct a nonlinear prediction model of a gas outburst chaotic system related to the gradient of the gas pressure and the gradient changes of ground stress fields; and the differential equation is solved iteratively using a fourth-order Runge-Kutta algorithm;
11) checking the sensitivity of stress field changes, displacement field changes, gas field changes, and fissure field changes to the gradient of gas pressure and the gradient changes of the ground stress fields; and constructing a Lorenz's chaotic primer, constructing an attraction point of coal and gas outburst in coal mining, and using the obtained database to standardize, train and detect the chaotic primer;
12) making the model in the specified stress field change, deformation field change, gas field change and fissure field change, inputting the gradient of the gas pressure and the gradient limit information of the ground stress fields, and repeating the input of the stress field changes, the deformation field changes, the gas field changes and the fissure field changes, and outputting the experimental results, so that every result surrounds Lorenz's chaotic primer, all approaching the actual simulation; and obtaining a chaotic model for predicting coal and gas outburst in a final mature period;
13) linking a programmed numerical simulator, a convolutional neural model and the chaotic model for predicting coal and gas outburst to construct a simulation and prediction matching comparison system; and constructing machine autonomous learning, using unsupervised learning methods to continuously learn, and finally getting a smart coal and gas predicting intelligent system.

Furthermore, before step 7), there is also a related step of data cleaning for abnormal values and missing values existing in the original data.

Furthermore, in step 8), a normalizing method is used to avoid saturation of neurons.

Furthermore, in step 8), simulated coincidence correlation degree is selected as an evaluation index in the model training process.

Furthermore, in step 8), the CNN-LSTM predicting model includes a convolutional neural network CNN part and a long and short-term memory network LSTM part. The convolutional neural network CNN part is used to express and extract data at the bottom, and the long and short-term memory network LSTM part is used to receive the output of the CNN extracted features.

The technical effects of the invention are beyond doubt:
A. The model can be improved with continuous breakthroughs in theory. The model has a strong learning ability and can adapt to the constantly changing complex geological environment.
B. Its accuracy and reliability can be continuously improved along with the simulation and are continuously modified in the machine self-learning simulation.
C. The Lorenz chaotic system of a modern physics computer is introduced into the predicting system of coal mining, in which the randomness of the chaotic system and the randomness of the gas burst have a good match. The randomness of events in real engineering problems is very instructive.
D. It has very good predictability for the determination of coal seam group parameters, and can efficiently select and output a set of candidate parameters.

DETAILED DESCRIPTION OF THE PREFERRED EMBODIMENTS

The invention will be further described below in conjunction with embodiments, but it should not be understood that the scope of the above subject matter of the present invention is limited to the following embodiments. Without departing from the above technical idea of the invention, various substitutions and changes based on common technical knowledge and conventional means in the field should be included in the protection scope of the invention.

Embodiment 1

Figure 1A:
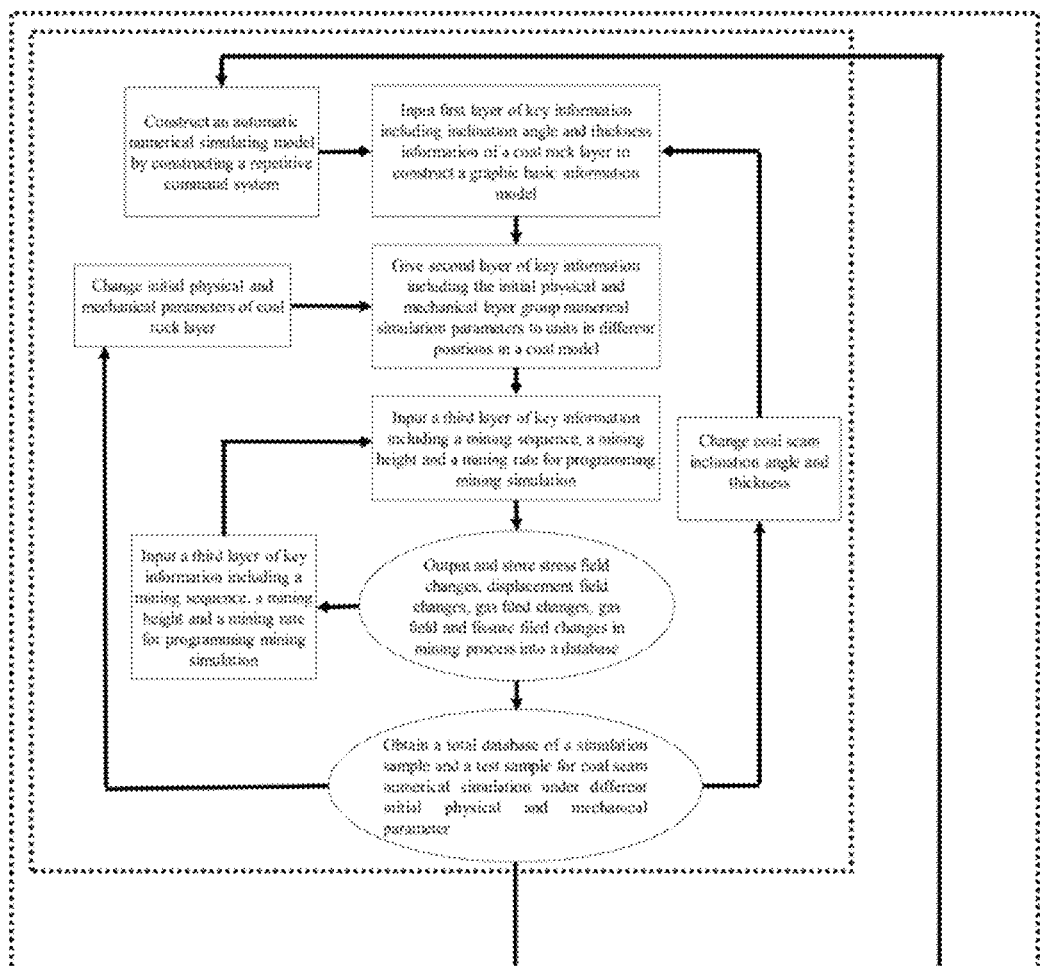
FIG. 1A and FIG. 1B illustrate a flowchart of a method.
Figure 1B:
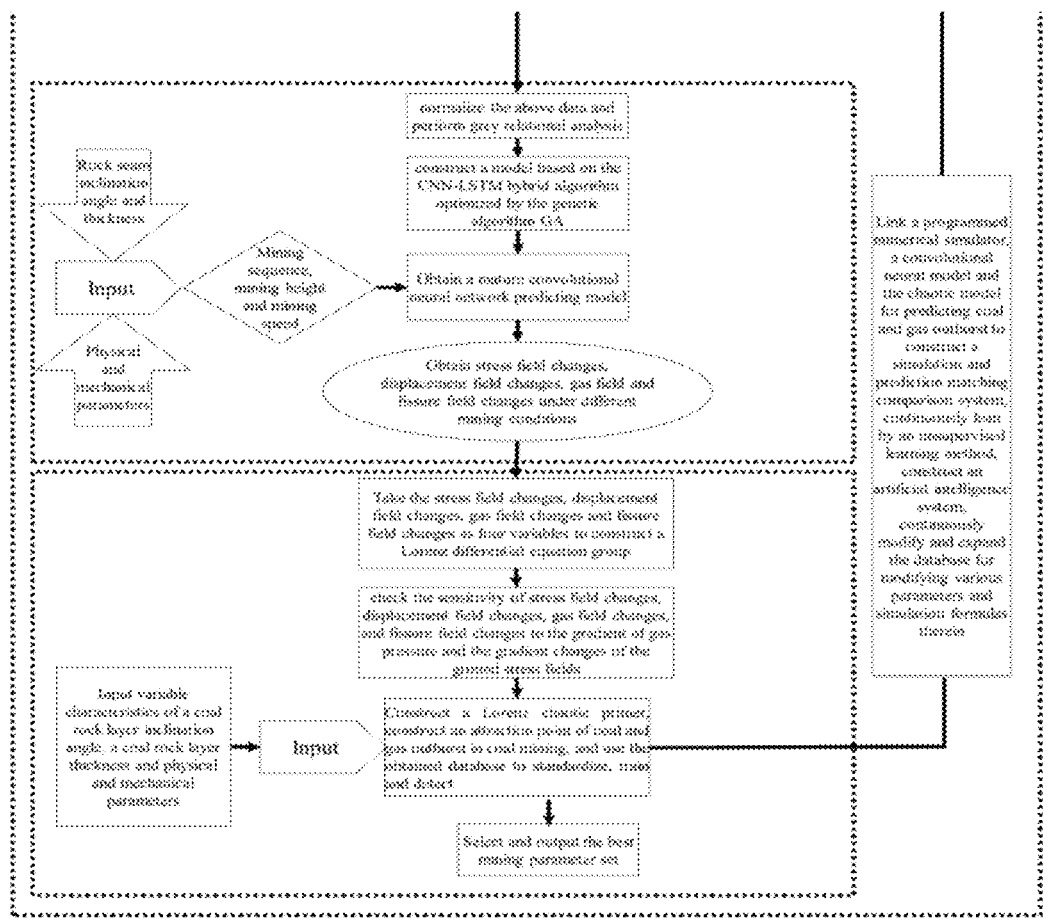
Figure 2:
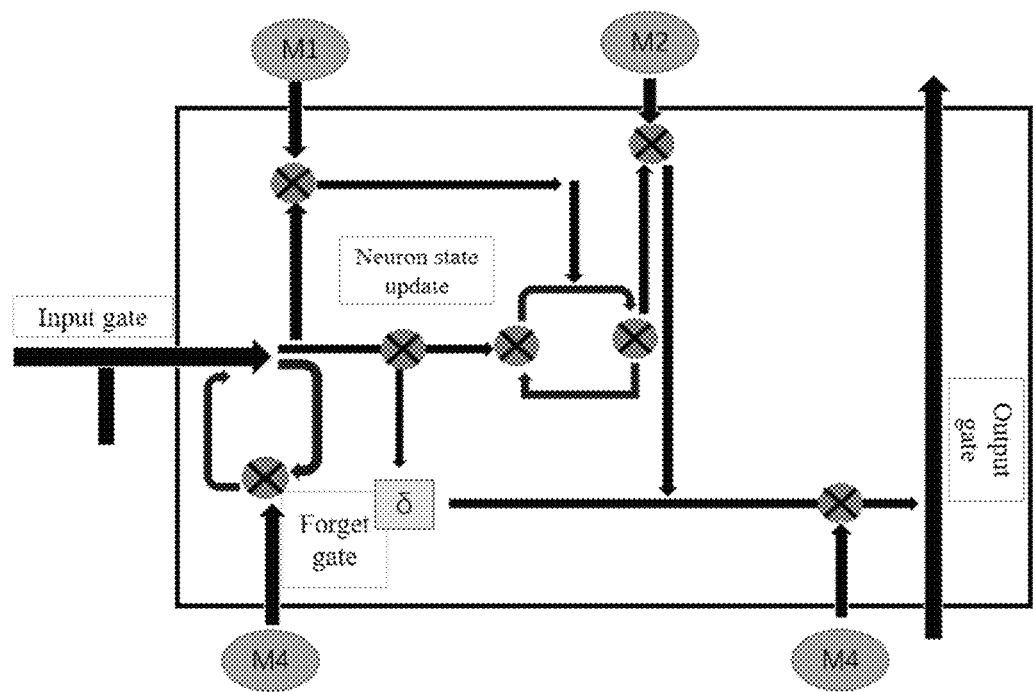
FIG. 2 is a logical structure diagram of a hybrid CNN-LSTM model.

Referring to FIG. 1A and FIG. 1B, FIG. 1A is continued in FIG. 1B, and the embodiment provides a method for quickly optimizing key mining parameters of an outburst coal seam, including the following steps:
1) constructing an automatic numerical simulating model, which uses an application program automating method to construct an operating environment and write automatic parameter modifying programs, where three-dimensional finite difference program, based on the basic information of the coal mine, includes the inclination angle and thickness of the coal rock layer, is then programmed to carry out numerical simulation and automatically construct a graphic basic information model of the related coal mine;
2) giving coal mine characteristic information mainly including initial physical and mechanical parameters to units for numerical simulation in different positions in the graphic basic information model, where the physical and mechanical parameters mainly include rock bulk density, compression resistance, shear resistance, tensile strength and tangential stiffness;
3) inputting coal mine simulating mining information inducing a mining sequence, mining height and a mining rate to perform programmed mining simulation; and outputting and storing the stress field changes, displacement field changes, gas pressure field changes and fissure field changes during the mining process in a database;
4) changing the coal seam mining sequence, mining height and mining speed respectively, repeating the step 3), and obtaining a data set of the displacement fields, stress fields, gas fields and fracture fields under different mining sequences, different mining height and different mining speed;
5) changing the initial physical and mechanical parameters of the coal rock layer and repeating steps 2) to 4) to obtain a secondary database of sample data for numerical simulation of the coal layer under different initial physical and mechanical parameters;
6) changing the inclination angle and the thickness of the coal rock layer and repeating steps 1) to 5) to obtain a total database of sample data for coal rock simulation under different inclination angles and thicknesses;
7), carrying out data cleaning for abnormal values and missing values existing in the original data; in this embodiment, a neighboring mean method is used to replace the abnormal data value, and the previous non-null value of the missing value is used to fill in the missing value; and according to the characteristics of different dimensional values in the data, a Minmax Scala method is used to scale the data and improve the model operation efficiency.
8) normalizing the data and carrying out grey relational analysis to analyze the variable characteristics of a coal seam mining sequence, a mining height, a mining speed, a coal rock layer inclination angle, a coal rock layer thickness and physical and mechanical parameters;
9) constructing a model based on the CNN-LSTM hybrid algorithm optimized by the genetic algorithm GA, and finally training to obtain a mature convolutional neural network predicting model, where, refer to FIG. 2, the CNN-LSTM model is divided into two parts; the convolutional neural network CNN part is used to express and extract data at the bottom to obtain more important feature information; the convolutional neural network CNN is mainly constructed by an input layer, a convolutional layer, a pooling layer, a weighted connecting layer, and an output layer; the long and short-term memory network LSTM part is used to receive the output of the CNN extracted features; the construction of LSTM network is mainly based on the effect mechanism of an input gate, an output gate and a forget gate; according to its memory in time series, time series features can be accurately extracted to predict the stress field changes, the displacement field changes, the gas field changes and the fissure field changes to achieve the final prediction results;

it should be noted that simulated coincidence correlation degree is selected as an evaluation index in the model training process; the data obtained by the simulation and the numerical simulation data are fitted and analyzed to obtain the degree of fit; a fitness set is constructed, data beyond the fit range are extruded and included in an event set A, and a loss rate is included in set B; a loss function is constructed through the constructed set A and set B, which is characterized by a fuzzy loss rate; and in the continuous automatic simulation process, the loss function is continuously modified;

10) inputting the required simulated coal mine information including variable characteristics of a coal rock layer inclination angle, a coal rock layer thickness and physical and mechanical parameters, changing the coal seam mining sequence, mining height and mining speed, and obtaining the stress field changes, the displacement field changes, the gas field changes and the fissure field changes under different mining conditions;

11) taking the changes of the coal seam stress fields, displacement fields, gas fields and fissure fields as four variables to construct a system of ordinary differential equations, and using a Lorenz differential equation to construct a nonlinear prediction model of a gas outburst chaotic system related to the gradient of the gas pressure and the gradient changes of ground stress fields, where the differential equation is solved iteratively using a fourth-order Runge-Kutta algorithm;

12) usingTurboC2.0 for programming to test the sensitivity of stress field changes, displacement field changes, gas field changes and fissure field changes to the gradient of gas pressure and the gradient of ground stress fields, and then construct a Lorenz's chaotic primer to construct an attraction point of coal and gas outburst in coal mining, and using the obtained database to standardize, train and detect the chaotic primer;

14) making the model in the specified stress field change, deformation field change, gas field change and fissure field change, inputting the gradient of the gas pressure and the gradient limit information of the ground stress fields, and repeating the input of the stress field changes, the deformation field changes, the gas field changes and the fissure field changes, and outputting the experimental results, so that every result surrounds Lorenz's chaotic primer, all approaching the actual simulation, thereby obtaining a chaotic model for predicting coal and gas outburst in a final mature period;

15) linking a programmed numerical simulator, a convolutional neural model and the chaotic model for predicting coal and gas outburst to construct a simulation and prediction matching comparison system; and constructing machine autonomous learning, using unsupervised learning methods to continuously learn, and finally getting a smart coal and gas predicting intelligent system with extremely strong reliability;

16) inputting the variable characteristics of a coal seam mining sequence, a coal rock layer thickness and physical and mechanical parameters, a coal seam mining sequence set, a mining height set and a mining speed set, and automatically selecting the best mining parameter set.

Embodiment 2

The embodiment provides a method for quickly optimizing key mining parameters of an outburst coal seam, including the following steps:

1) constructing an automatic numerical simulating model by constructing a repetitive command system; and obtaining a graphic basic information model of the coal mine according to the simulation analysis of the basic information of the coal mine by three-dimensional finite difference program, where the basic information of the coal mine includes an inclination angle and a thickness of a coal rock layer; and each coal rock layer is divided into a certain number of units;

2) giving coal mine characteristic information to units in different positions in the graphic basic information model, where the coal mine characteristic information includes initial physical and mechanical parameters; and physical and mechanical property parameters include rock bulk density, compression resistance, shear resistance, tensile strength and tangential stiffness;

3) inputting coal mine simulating mining information to perform programmed mining simulation; and outputting and storing the stress field changes, displacement field changes, gas pressure field changes and fissure field changes during the mining process in a database; where the mining information includes a mining sequence, mining height and a mining rate;

4) changing the coal seam mining sequence, mining height and mining speed respectively, repeating the step 3), and obtaining a data set of the displacement fields, stress fields, gas fields and fracture fields under different mining sequences, different mining height and different mining speed;

5) changing the initial physical and mechanical parameters of the coal rock layer and repeating steps 2) to 4) to obtain a secondary database of sample data for numerical simulation of the coal layer under different initial physical and mechanical parameters;

6) changing the inclination angle and the thickness of the coal rock layer and repeating steps 1) to 5) to obtain a secondary database of sample data for coal rock simulation of the coal rock layer under different inclination angles and thicknesses;

7) normalizing the above data, where grey relational analysis is carried out to analyze the variable characteristics of a coal seam mining sequence, a mining height, a mining speed, a coal rock layer inclination angle, a coal rock layer thickness and physical and mechanical parameters;

8) constructing and training a CNN-LSTM predicting mode, where the CNN-LSTM predicting model includes two convolutional neural layers and a long- and short-term neural layer; and each convolutional neural layer includes an input layer, a convolutional layer, a pooling layer, a weighted connecting layer, and an output layer;

9) inputting the required simulated coal mine information, changing the coal seam mining sequence, mining height and mining speed, and obtaining the stress field changes, the displacement field changes, the gas field changes and the fissure field changes under different mining conditions, where the coal mine information includes variable characteristics of the inclination angle of the coal rock layer, the thickness of the coal rock layer and the physical and mechanical parameters;

10) taking the changes of the coal seam stress fields, displacement fields, gas fields and fissure fields as four variables to construct a system of ordinary differential equations, where a Lorenz differential equations is used to construct a nonlinear prediction model of a gas outburst chaotic system related to the gradient of the gas pressure and the gradient changes of ground stress fields; and the differential equation is solved iteratively using a fourth-order Runge-Kutta algorithm;

11) checking the sensitivity of stress field changes, displacement field changes, gas field changes, and fissure field changes to the gradient of gas pressure and the gradient changes of the ground stress fields; and constructing a Lorenz's chaotic primer, constructing an attraction point of coal and gas outburst in coal mining, and using the obtained database to standardize, train and detect the chaotic primer;

12) making the model in the specified stress field change, deformation field change, gas field change and fissure field change, inputting the gradient of the gas pressure and the gradient limit information of the ground stress fields, and repeating the input of the stress field changes, the deformation field changes, the gas field changes and the fissure field changes, and outputting the experimental results, so that every result surrounds Lorenz's chaotic primer, all approaching the actual simulation; and obtaining a chaotic model for predicting coal and gas outburst in a final mature period;

13) linking a programmed numerical simulator, a convolutional neural model and the chaotic model for predicting coal and gas outburst to construct a simulation and prediction matching comparison system; and constructing machine autonomous learning, using unsupervised learning methods to continuously learn, and finally getting a smart coal and gas predicting intelligent system.

This embodiment is suitable for single-layer coal seam simulation and more complex multi-layer coal seam simulation. Through the operation of the model and machine learning, the reliability is continuously improved and certain model optimization can be carried out.

Embodiment 3

The main structure of this embodiment is the same as that of embodiment 2, where, before step 7), there is also a related step of data cleaning for abnormal values and missing values existing in the original data.

Embodiment 4

The main structure of this embodiment is the same as that of embodiment 2, where in step 8), a normalization processing method is used to avoid saturation of neurons.

Embodiment 5

The main structure of this embodiment is the same as that of embodiment 2, where in step 8), the evaluation index in the model training process selects the simulated coincidence correlation.

Embodiment 6

The main structure of this embodiment is the same as that of embodiment 2, where in step 8), the CNN-LSTM predicting model includes a convolutional neural network CNN part and a long and short-term memory network LSTM part. The convolutional neural network CNN part is used to express and extract data at the bottom, and the long and short-term memory network LSTM part is used to receive the output of the CNN extracted features.

Embodiment 6

The embodiment provides a method for quickly optimizing key mining parameters of an outburst coal seam, including the following steps:

1) constructing an automatic numerical simulating model by constructing a repetitive command system; inputting the basic information of the coal mine, including the inclination angle and thickness of the coal and rock layers, and then programming the numerical simulation to automatically construct the graphic basic information model of the related coal mine;

2) giving coal mine characteristic information mainly including initial physical and mechanical parameters to units for numerical simulation in different positions in the graphic basic information model, where the physical and mechanical parameters mainly include rock bulk density, compression resistance, shear resistance, tensile strength and tangential stiffness;

3) inputting coal mine simulating mining information inducing a mining sequence, mining height and a mining rate to perform programmed mining simulation; and outputting and storing the stress field changes, displacement field changes, gas pressure field changes and fissure field changes during the mining process in a database;

4) changing the coal seam mining sequence, mining height and mining speed respectively, repeating the step 3), and obtaining a data set of the displacement fields, stress fields, gas fields and fracture fields under different mining sequences, different mining height and different mining speed;

5) changing the initial physical and mechanical parameters of the coal rock layer and repeating steps 2) to 4) to obtain a secondary database of sample data for numerical simulation of the coal layer under different initial physical and mechanical parameters;

6) changing the inclination angle and the thickness of the coal rock layer and repeating steps 1) to 5) to obtain a total database of sample data for coal rock simulation under different inclination angles and thicknesses;

8) normalizing the data and carrying out grey relational analysis to analyze the variable characteristics of a coal seam mining sequence, a mining height, a mining speed, a coal rock layer inclination angle, a coal rock layer thickness and physical and mechanical parameters;

9) constructing a model based on the CNN-LSTM hybrid algorithm optimized by the genetic algorithm GA, including an input layer, a convolutional layer, a pooling layer, a weighted connecting layer, and an output layer; where the predicting model includes two convolutional neural layers and a long- and short-term neural layer; and finally training to obtain a mature convolutional neural network predicting model;

10) inputting the required simulated coal mine information including variable characteristics of a coal rock layer inclination angle, a coal rock layer thickness and physical and mechanical parameters, changing the coal seam mining sequence, mining height and mining speed, and obtaining the stress field changes, the displacement field changes, the gas field changes and the fissure field changes under different mining conditions;

11) taking the changes of the coal seam stress fields, displacement fields, gas fields and fissure fields as four variables to construct a system of ordinary differential equations, and using a Lorenz differential equation to construct a nonlinear prediction model of a gas outburst chaotic system related to the gradient of the gas pressure and the gradient changes of ground stress fields, where the differential equation is solved iteratively using a fourth-order Runge-Kutta algorithm;

12) usingTurboC2.0 for programming to test the sensitivity of stress field changes, displacement field changes, gas field changes and fissure field changes to the gradient of gas pressure and the gradient of ground stress fields, and then construct a Lorenz's chaotic primer to construct an attraction point of coal and gas outburst in coal mining, and using the obtained database to standardize, train and detect the chaotic primer;

14) making the model in the specified stress field change, deformation field change, gas field change and fissure field change, inputting the gradient of the gas pressure and the gradient limit information of the ground stress fields, and repeating the input of the stress field changes, the deformation field changes, the gas field changes and the fissure field changes, and outputting the experimental results, so that every result surrounds Lorenz's chaotic primer, all approaching the actual simulation, thereby obtaining a chaotic model for predicting coal and gas outburst in a final mature period;

15) linking a programmed numerical simulator, a convolutional neural model and the chaotic model for predicting coal and gas outburst to construct a simulation and prediction matching comparison system; and constructing machine autonomous learning, using unsupervised learning methods to continuously learn, and finally getting a smart coal and gas predicting intelligent system with extremely strong reliability;

16) inputting the variable characteristics of a coal seam mining sequence, a coal rock layer thickness and physical and mechanical parameters, a coal seam mining sequence set, a mining height set and a mining speed set, and automatically selecting the best mining parameter set.

What is claimed is:

1. A method for quickly optimizing key mining parameters of an outburst coal seam, comprising the following steps:
   1) constructing an automatic numerical simulating model by constructing a repetitive command system; and obtaining a graphic basic information model of a coal mine, wherein the graphic basic information of the coal mine comprises an inclination angle and a thickness of a coal rock layer; and each coal rock layer is divided into a certain number of units;
   2) giving coal mine characteristic information to units in different positions in the graphic basic information model, wherein the coal mine characteristic information comprises initial physical and mechanical parameters; and physical and mechanical property parameters comprise rock bulk density, compression resistance, shear resistance, tensile strength and tangential stiffness;
   3) inputting coal mine simulating mining information to perform programmed mining simulation; and outputting and storing stress field changes, displacement field changes, gas pressure field changes and fissure field changes during mining process in a database, wherein the mining information comprises a coal seam mining sequence, mining height and a mining rate;
   4) changing the coal seam mining sequence, mining height and mining speed respectively, repeating the step 3), and obtaining a data set of displacement fields, stress fields, gas fields and fracture fields under different coal seam mining sequences, different mining height and different mining speed;
   5) changing the initial physical and mechanical parameters of the coal rock layer and repeating steps 2) to 4) to obtain a secondary database of sample data for numerical simulation of the coal layer under different initial physical and mechanical parameters;
   6) changing an inclination angle and a thickness of the coal rock layer and repeating steps 1) to 5) to obtain the secondary database of sample data for coal rock simulation of the coal rock layer under different inclination angles and thicknesses;
   7) normalizing the sample data for coal rock simulation of the coal rock layer, wherein grey relational analysis is carried out to analyze variable characteristics of the coal seam mining sequence, the mining height, the mining speed, a coal rock layer inclination angle, a coal rock layer thickness and physical and mechanical parameters;
   8) constructing and training a CNN-LSTM predicting model, wherein the CNN-LSTM predicting model comprises two convolutional neural layers and a long- and short-term neural layer; and each convolutional neural layer comprises an input layer, a convolutional layer, a pooling layer, a weighted connecting layer, and an output layer, and the CNN-LSTM predicting model comprises a convolutional neural network CNN part and a long and short-term memory network LSTM part; the convolutional neural network CNN part is used to express and extract data at the bottom, and the long and short-term memory network LSTM part is used to receive the output of the CNN extracted features, wherein the CNN-LSTM predicting model predicts stress field changes, displacement field changes, gas field changes and fissure field changes;
   9) inputting into the CNN-LSTM predicting model required simulated coal mine information, changing the coal seam mining sequence, mining height and mining speed, and obtaining the stress field changes, the displacement field changes, the gas field changes and the fissure field changes under different mining conditions, wherein the required simulated coal mine information comprises variable characteristics of the inclination angle of the coal rock layer, the thickness of the coal rock layer and the physical and mechanical parameters;
   10) taking the changes of the coal seam stress fields, displacement fields, gas fields and fissure fields as four variables to construct a system of ordinary differential equations, wherein a Lorenz differential equation is used to construct a nonlinear prediction model of a gas outburst chaotic system related to the gradient of the gas pressure and the gradient changes of ground stress field; and the differential equation is solved iteratively using a fourth-order Runge-Kutta algorithm;
   11) checking the sensitivity of stress field changes, displacement field changes, gas field changes, and fissure field changes to the gradient of gas pressure and the gradient changes of the ground stress fields; and constructing a Lorenz's chaotic primer, constructing an attraction point of coal and gas outburst in coal mining, and using the obtained database to standardize, train and detect the chaotic primer;

12) making the model in the specified stress field change, deformation field change, gas field change and fissure field change, inputting the gradient of the gas pressure and the gradient limit information of the ground stress fields, and repeating the input of the stress field changes, the deformation field changes, the gas field changes and the fissure field changes, and outputting the experimental results, so that every result surrounds Lorenz's chaotic primer, all approaching the actual simulation; and obtaining a chaotic model for predicting coal and gas outburst in a final mature period; and 13) constructing machine autonomous learning, using unsupervised learning methods to continuously learn, and finally getting a smart coal and gas predicting intelligent system.

2. The method for quickly optimizing key mining parameters of an outburst coal seam according to claim 1, before step 7), there is also a related step of data cleaning for abnormal values and missing values existing in the original data.

3. The method for quickly optimizing key mining parameters of an outburst coal seam according to claim 1, wherein in the step 8), a normalizing method is used to avoid saturation of neurons.

4. The method for quickly optimizing key mining parameters of an outburst coal seam according to claim 1, wherein in step 8), simulated coincidence correlation degree is selected as an evaluation index in the model training process.

* * * * *